May 16, 1967 G. L. TRAVERS 3,319,952

PNEUMATIC OR AIR SPRINGS

Filed March 15, 1965

INVENTOR
GEORGES LOUIS TRAVERS
BY
HIS ATTORNEYS

United States Patent Office 3,319,952
Patented May 16, 1967

3,319,952
PNEUMATIC OR AIR SPRINGS
Georges Louis Travers, Clermont-Ferrand, France, assignor to Compagnie Generale des Etablissements Michelin, raison sociale Michelin & Cie, Clermont-Ferrand, France
Filed Mar. 15, 1965, Ser. No. 440,025
5 Claims. (Cl. 267—65)

This invention relates to improvements in pneumatic or air springs, and more particularly to improvements in the means for securing the air spring bellows to the supports therefor.

Heretofore, air springs have included a sleeve or bellows formed of resilient rubbery material, such as natural or synthetic rubber, which is reinforced throughout substantially its entire extent by one or more plies of reinforcing cords. The ends of the sleeve or bellows usually contain circumferentially extending reinforcements which resist stretching of the ends of the bellows and are intended to enable the bellows to be secured tightly to the air spring mounts on, for example, a vehicle axle and vehicle frame. The presence of circumferential reinforcing elements makes it difficult to install the bellows on the mounts and also has a tendency to cause the ends of the bellows to wrinkle or be deformed slightly when they are clamped in place, thereby increasing the possibility of leakage or loss of air or other gas from the interior of the bellows.

In accordance with the present invention, means are provided for obtaining a more secure attachment of the ends of a pneumatic or air spring bellows to the supports therefor while facilitating their attachment to the supports. More particularly, in accordance with the present invention, the ends of the bellows are provided with additional plies of reinforcement which permit some axial and circumferential extension of the ends but together with an elastomer of greater hardness in the end portions of the bellows, renders the walls of the end portions substantially incompressible in a radial direction. Moreover, in accordance with the present invention, the end portions of the bellows are tapered in thickness in such a manner that their inner and outer surfaces diverge in an axial direction for cooperation with generally complementally shaped surfaces on the air spring supports and retaining members for securing the end portions of the bellows in air-tight and secure engagement with the supports. The provision of slight axial and circumferential extensibility of the ends of the bellows facilitates their placement on the tapered portions of the support by enabling the ends of the bellows or sleeve to be slipped over or into the tapered portion and then clamped in place by means of the retaining member.

In accordance with the present invention, one of the retaining members is a spring-biased piston which can be displaced to allow insertion of the end of the bellows in a conical cavity in the support and upon release engages the portion of the bellows in the support and securely locks it in position. The other retaining member may consist of a tapered ring which cooperates with the wedge-shaped end of the bellows and a tapered portion on the spring mount to clamp the bellows on the mount. Both types of retaining members act in such manners that axial stresses tending to dislodge the end of the bellows from the support tend to retain the bellows more tightly on and in secure engagement with the supports.

For a better understanding of the present invention, reference may be had to the accompanying drawings, in which FIGURE 1 is a view in vertical section through a typical pneumatic or air spring embodying the present invention with a portion of one of the supports broken away;

Figure 2:
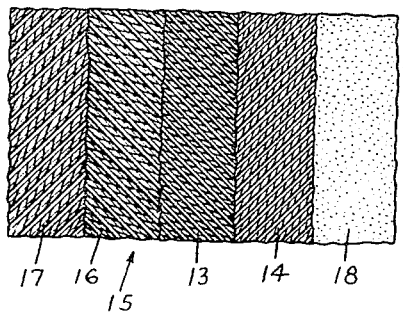
FIGURE 2 is a view in cross-section taken on line 2—2 of FIGURE 1 showing the construction of the end portion of the bellows of the air spring.

For purposes of illustration, the air spring 10 includes a sleeve 11 having the shape of a torus, although it can be a multiple torus (bellows) sleeve. For convenience, the single torus sleeve 11 and multiple torus bellows will be referred to hereinafter as a bellows. The bellows 11 is formed of resilient elastomeric material such as, for example, synthetic or natural rubber 12, in which are embedded two plies 13 and 14 of natural or synthetic fiber, or metallic filament, reinforcing cords, substantially coextensive therewith. As best shown in FIGURE 2, the cords in the ply 13 lie substantially parallel and are inclined in crossing or bias relation to the parallel cords in the ply 14. Inasmuch as these cords do not form triangles with each other, the end portion 15 of the bellows is capable of some slight extensibility in all directions. The end portion 15 of the bellows is provided with two additional strips or narrow plies of cords 16 and 17. As shown in FIGURE 2, the cords of the ply 17 are substantially parallel with the cords of the ply 14 while the parallel cords of the ply 16 are substantially parallel with the cords of the ply 13. In this way, a reinforced end is provided on the bellows which nevertheless retains some slight circumferential and axial extensibility.

In accordance with the present invention, the plies 16 and 17 and the portions of the plies 13 and 14 adjacent to the plies 16 and 17 are embedded in or laid between a layer or layers 18 of a hard elastomer, such as synthetic or natural rubber, for example, having a hardness of between about 70° and 90° Shore. The hard elastomer in layer or layers of the end portion 15 containing the plies 16 and 17 renders the wall substantially incompressible in cross-section in a radial direction.

Figure 1:
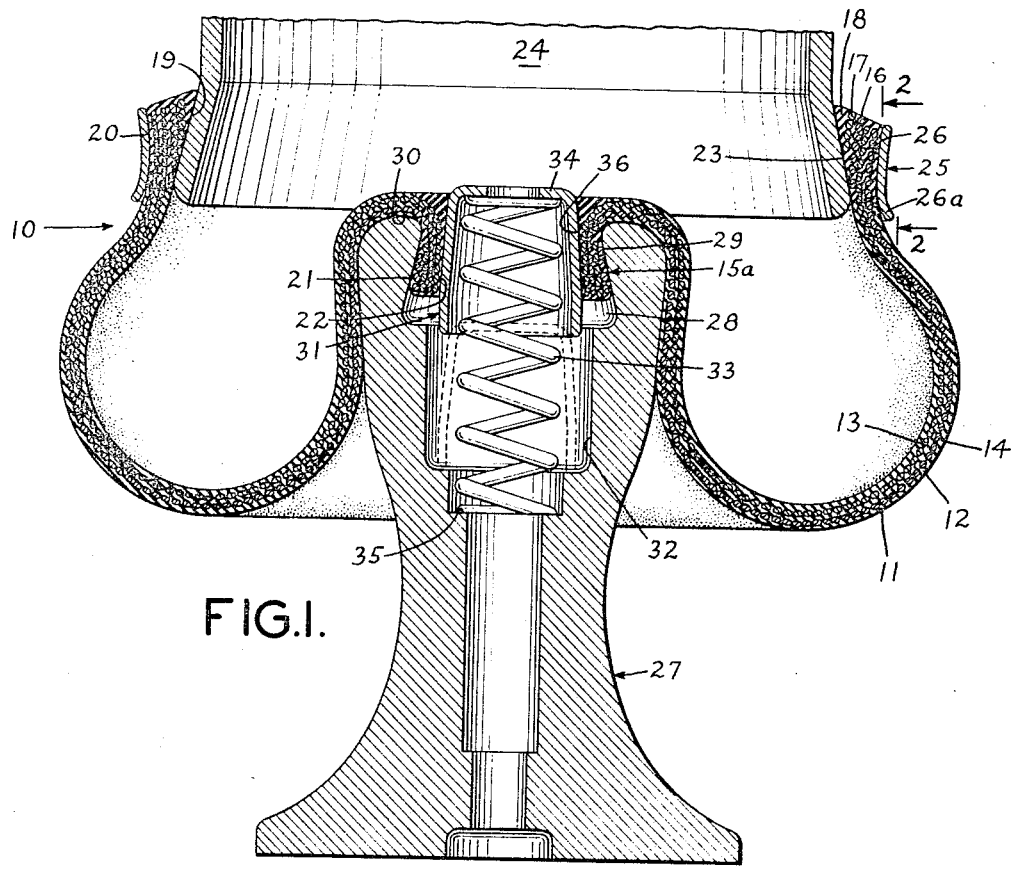

The lower end portions 15a of the bellows is reinforced and constructed in generally the same way although, as shown in FIGURE 1, the end portion 15a is of smaller diameter than the upper end portion 15 of the bellows.

As shown in FIGURE 1, the upper end of the bellows has axially, upwardly diverging inner and outer surfaces 19 and 20. Also, the surfaces 21 and 22 of the lower end portion 15a diverge downwardly forming a wedgelike or dovetail cross-sectional shape. The inner surface 19 is substantially complemental to the outer downwardly flared conical surface 23 of the upper air spring mount 24. Due to the circumferential extensibility of the upper end of the bellows, it can be slipped over the flared surface 23 from below and is clamped in place thereon by means of an endless retaining ring 25. The ring 25 has an inner downwardly converging surface 26 which terminates in an outwardly flared and rounded zone 26a to avoid sharp flexing of the bellows at the edge of the ring while in operation. The outer surface 23 of the support 24 and the inner surface 26 of the ring 25 converge downwardly toward the lower spring mount support or pedestal 27 essentially complementally to the inner and outer surfaces of the upper end of the bellows with the result that when the ring 25 is forced downwardly, the upper end of the bellows is gripped firmly between the surfaces 23 and 26 and due to the incompressibility of the clamped portion of the bellows, it cannot become detached from the support 24. In fact, downward tension on the bellows tends to clamp it more securely to the support 24.

The lower end 15a of the bellows is received in a conical recess 28 in the upper end of the pedestal 27, the taper of the wall 29 of the conical recess being substantially complemental to the taper of the outer surface 21 of the lower end 15a of the bellows. The pedestal has a rounded upper edge 30 to support the overlying portion of the bellows against sharp flexing and possible damage thereto.

A piston-like locking member 31 is movable axially in the conical recess 28 and a generally cylindrical recess 32 of reduced diameter below the recess 28. A spring 33 having its upper end bearing against the interior of the head 34 of the locking member 31 and its lower end engaging a shoulder 35 below the recess 32 biases the piston upwardly. The sides 36 of the piston 31 converge upwardly but at a lesser angle than the inclination of the wall 29 so that the wedge-shaped end portion 15a of the bellows can be clamped and secured therebetween. The lower end 15a of the bellows can be readily attached to the pedestal by forcing the piston 31 downwardly, inserting the end portion 15a of the bellows into the recess 28 and then releasing the piston 31 so that it will slide into the interior of the end portion 15a of the bellows and wedge it in position. Due to the radial incompressibility of the wall of the end portion 15a, the bellows is locked securely to the pedestal and any tension stress tending to pull the end portion 15a out of the recess 28 will only serve to lock it more securely in position.

In a typical air spring, the included angle between the surfaces 19 and 20 of the end portion 15 of the bellows is between about 19° and 40°. The included angle between the surfaces 21 and 22 of the end portion 15a is between about 9° and 20°.

Figure 3:
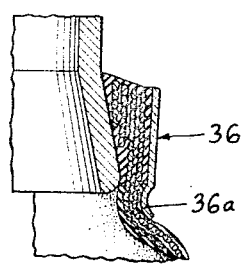
FIGURE 3 is a view in section through a portion of a modified securing means for the bellows.
Figure 4:
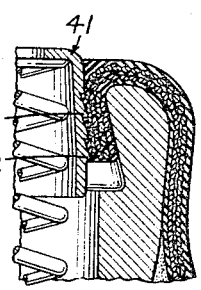
FIGURE 4 is a view in section through a modified means for securing the opposite end of the bellows to its support.

It will be understood that the means for securing the bellows to the bellows supports are susceptible to considerable modifications. Thus, as shown in FIGURE 3, the locking ring 36 may have its upper portion converging downwardly and its lower end 36a shaped to a concavo-convex cross-section to prevent sharp bending of the bellows and possible damage thereto. Also, as shown in FIGURE 4, the piston 41 may be provided with grooves forming teeth 42 to bite into the end portion of the bellows and thereby lock it more securely in position. The upwardly converging outer surface of the piston facilitates its entry into the lower end of the bellows, and the provision of a roughened zone or serrated portion on the piston tends to lock the end of the bellows more securely in position.

Other changes may be made in the air or penumatic spring as indicated above, namely, in the sizes and shapes of the bellows, and the types of bellows supports, depending upon requirements. Accordingly, the forms of the invention described herein should be considered as illustrative and not as limiting the scope of the invention.

I claim:
1. An air spring bellows comprising an endless flexible wall and open end portions, a plurality of plies of cords reinforcing said end portions, the cords of each ply being substantially parallel and the cords of said plies being laid in no more than two directions, said end portions being devoid of circumferentially extending reinforcements and being substantially wedge-shaped and each end portion having inner and outer surfaces converging toward the other end portion and an elastomer in said end portions having a hardness between about 70° and 90° Shore whereby said end portions are substantially incompressible in cross-section and slightly extensible circumferentially and axially.

2. A penumatic spring comprising a bellows having an endless flexible wall and open end portions, reinforcing means in said end portions rendering said wall at said end portions substantially incompressible radially and slightly extensible axially and circumferentially, said wall at said end portions being substantially wedge-shaped and each end portion having inner and outer surfaces converging toward the other end portion, a mounting member for each end of said bellows, a conical surface on each mount substantially complemental to a surface on a corresponding end of said bellows, and a retaining member for each end of said bellows having a surface substantially complemental to the other surface of the corresponding end of said bellows, one of said retaining members comprising a piston member movable in a mounting member and having a conical outer surface engageable with the inner surface of one of said end portions and spring means in said mounting member biasing said piston member into engagement with said one end portion.

3. An air spring comprising a pair of mounting members substantially in axial alignment, an outwardly diverging conical surface on one of said mounting members, a recess in the other mounting member having an interior conical surface converging toward said one mounting member, a bellows having open end portions of wedge-shaped cross-section, each of said end portions having inner and outer surfaces converging toward the other end portion, one of said end portions having an inner surface engaging said outwardly diverging conical surface in substantially complemental relation thereto and the other end portion having an outer surface engaging said interior conical surface in substantially complemental relation thereto, a tapering retaining ring engaging and substantially complemental to the outer surface of said one end portion and a spring biased plunger substantially complemental to and engaging the inner surface of said other end portion for locking said end portions to said mounting members.

4. The air spring set forth in claim 3 in which said end portions contain a reinforcement comprising an elastomer having a hardness between about 70° and 90° Shore rendering them substantially incompressible in section.

5. The air spring set forth in claim 3 in which said bellows comprises at least one ply of reinforcing cords substantially coextensive therewith, at least one narrow ply of reinforcing cords in each wedge-shaped end portion, all of said cords in said plies in each end portion crossing each other at only one angle.

References Cited by the Examiner
UNITED STATES PATENTS

| | | | |
|---|---|---|---|
| 2,208,540 | 7/1940 | Brown | 267—35 |
| 3,053,528 | 9/1962 | Stengelin | 267—65 |
| 3,157,396 | 11/1964 | Long | 267—65 |

EUGENE G. BOTZ, *Primary Examiner.*

ARTHUR L. LA POINT, *Examiner.*

R. M. WOHLFARTH, *Assistant Examiner.*